US011641336B2

(12) United States Patent
Ghanwani et al.

(10) Patent No.: US 11,641,336 B2
(45) Date of Patent: May 2, 2023

(54) LIGHTWEIGHT HOST MULTIHOMING

(71) Applicant: DELL PRODUCTS L.P., Round Rock, TX (US)

(72) Inventors: Anoop Ghanwani, Roseville, CA (US); Anandaraj Maharajan, Woodinville, WA (US); Phaniraj Vattem, Santa Clara, CA (US)

(73) Assignee: DELL PRODUCTS L.P., Round Rock, TX (US)

(*) Notice: Subject to any disclaimer, the term of this patent is extended or adjusted under 35 U.S.C. 154(b) by 0 days.

(21) Appl. No.: 16/888,577

(22) Filed: May 29, 2020

(65) Prior Publication Data

US 2021/0377207 A1   Dec. 2, 2021

(51) Int. Cl.
| | |
|---|---|
| H04L 29/08 | (2006.01) |
| H04L 12/46 | (2006.01) |
| H04L 12/44 | (2006.01) |
| H04L 12/715 | (2013.01) |
| H04L 12/741 | (2013.01) |
| H04L 12/721 | (2013.01) |
| H04L 12/28 | (2006.01) |
| H04L 61/10 | (2022.01) |

(52) U.S. Cl.
CPC .................. H04L 61/10 (2013.01)

(58) Field of Classification Search
CPC ... H04L 61/10; H04L 61/103; H04L 61/1541; H04L 29/12839; H04L 29/12018; H04L 69/18; H04L 2012/5641; H04L 2012/5642; H04L 45/245; H04L 29/06149
USPC ........................................................ 709/224
See application file for complete search history.

(56) References Cited

U.S. PATENT DOCUMENTS

| | | | | |
|---|---|---|---|---|
| 8,699,708 B2* | 4/2014 | Hampel | .............. | H04W 12/121 |
| | | | | 713/181 |
| 8,787,149 B1* | 7/2014 | Ramanathan | ........... | H04L 45/58 |
| | | | | 370/216 |

(Continued)

OTHER PUBLICATIONS

Homchaudhuri et al.,"Cisco Systems' Private VLANs: Scalable Security in a Multi-Client Environment," Feb. 2010, [online], [Retrieved Oct. 14, 2020]. Retrieved from Internet <URL: https://www.rfc-editor.org/rfc/pdfrfc/rfc5517.txt.pdf> ( 12pgs).

*Primary Examiner* — Kevin T Bates
*Assistant Examiner* — Golam Mahmud
(74) *Attorney, Agent, or Firm* — North Weber & Baugh LLP

(57) ABSTRACT

Described herein are systems and methods for host multihoming with no state synchronization between top-of-rack (ToR) switches coupled to multiple hosts. ToR switches of a multi-homing system share a virtual MAC address and respond to Address Resolution Protocol (ARP) requests and/or Neighbor Discovery (ND) solicitations for a default gateway IP address from the host with the virtual MAC address. Ports on a ToR switch may be configured either with a static ARP and/or ND entry, or be configured to learn via a discovery protocol. The lightweight host multihoming system may have modified flooding behavior, ARP/ND handling, and data path forwarding. ARP/ND traffic from a host is processed by a ToR switch, while other multicast traffic may be discarded. Embodiments of the host multihoming system provide a lightweight solution for software implementation with minimal changes imposed on the host or network design.

20 Claims, 8 Drawing Sheets

(56) References Cited

U.S. PATENT DOCUMENTS

| | | | | |
|---|---|---|---|---|
| 8,913,489 | B2* | 12/2014 | Vinayagam | H04L 45/245 370/392 |
| 8,953,590 | B1* | 2/2015 | Aggarwal | H04L 12/4675 370/409 |
| 9,083,642 | B2* | 7/2015 | Janardhanan | H04L 49/70 |
| 9,628,375 | B2* | 4/2017 | Pathangi Narasimhan | H04L 41/0663 |
| 9,929,897 | B2* | 3/2018 | Thomas | H04L 69/324 |
| 10,237,163 | B2* | 3/2019 | Jacob | H04L 45/74 |
| 10,530,873 | B1* | 1/2020 | Arya | H04L 67/568 |
| 2006/0015635 | A1* | 1/2006 | Fernandes | H04L 61/00 709/232 |
| 2007/0248085 | A1* | 10/2007 | Volpano | H04L 63/0272 370/389 |
| 2013/0003738 | A1* | 1/2013 | Koganti | H04L 49/70 370/392 |
| 2014/0229620 | A1* | 8/2014 | Horman | H04L 47/783 709/226 |
| 2015/0195178 | A1* | 7/2015 | Bhattacharya | H04L 12/4633 718/1 |
| 2015/0281096 | A1* | 10/2015 | Boutros | H04L 41/12 370/231 |
| 2017/0195210 | A1* | 7/2017 | Jacob | H04L 69/321 |
| 2017/0288946 | A1* | 10/2017 | Thomas | H04L 45/22 |
| 2018/0302321 | A1* | 10/2018 | Manthiramoorthy | H04L 12/4641 |
| 2019/0319883 | A1* | 10/2019 | Zhou | H04L 45/66 |
| 2021/0152464 | A1* | 5/2021 | Brissette | H04L 45/28 |

* cited by examiner

LIGHTWEIGHT HOST MULTIHOMING

BACKGROUND

The present disclosure relates generally to host multihoming. More particularly, the present disclosure relates to lightweight host multihoming.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Multihoming is a practice of connecting a host or a computer network to more than one network. This may be done in order to increase reliability or performance. For host multihoming, a single host may be connected to multiple networks. A multihomed host is physically connected to multiple data links that can be on the same or different networks. A multihomed host may be assigned multiple addresses, one per connected network.

Various solutions have been implemented for multihoming multiple hosts within a single rack. For example, a Virtual Link Trunking (VLT) (or Link Aggregation Group (LAG)) may be implemented for an inter chassis link (ICL) between two top-of-rack (ToR) switches, with each ToR switch connected to the multiple hosts. However, the VLT approach is a heavyweight solution in terms of software implementation. An alternative approach would be depending on the hosts for an entire solution where each leg of the host has its own address/subnet. This approach imposes a heavy burden on address consumption and it is not as robust in situations, such as if an interface goes down, transmission control protocol (TCP) connections to that interface would go down as well, unless some form of tunneling is in use, which itself imposes complexity and data path overhead.

Accordingly, it is highly desirable have systems and methods for lightweight host multihoming.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

DETAILED DESCRIPTION OF THE PREFERRED EMBODIMENTS

Figure 1:
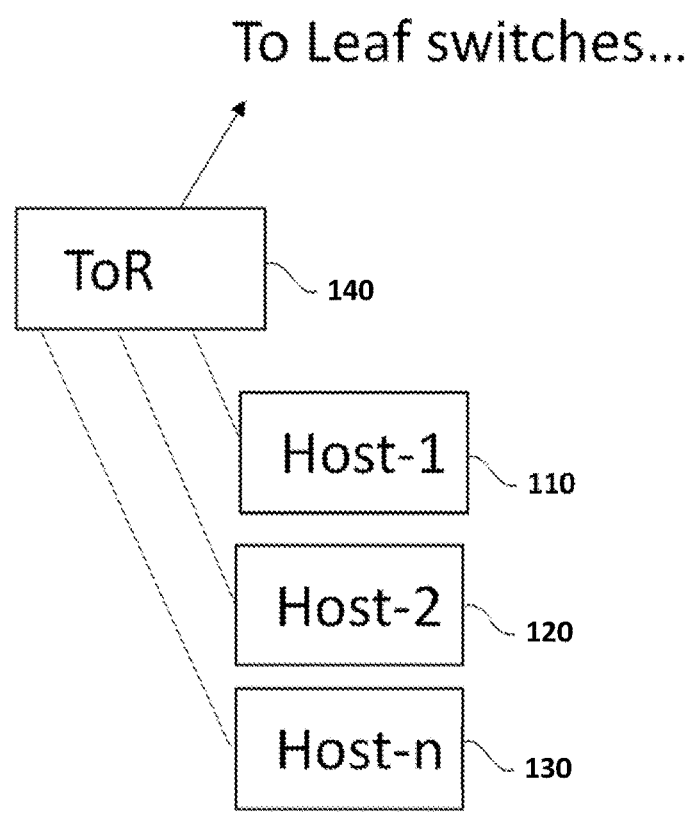
FIG. 1 ("FIG. 1") depicts a prior art single-homed network within a single rack.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although one or more embodiments described herein may be within the context of a network with ToR switches and multiple, aspects of the present disclosure are not so limited. Accordingly, the aspects of the present disclosure may be applied or adapted for use in other network configurations or contexts.

A. Introduction

FIG. 1 depicts a prior art single-homed network 100 with multiple hosts 110, 120, and 130 within a single rack and all coupled to a top-of-rack (ToR) switch 140, which may connect to a core of the network via one or more leaf switch. The ToR switch is the default gateway (GW) for all hosts which are locally connected to the ToR switch. In such a single rack multihoming system, the hosts 110-130 may be in the same or different subnets. When the hosts are in the same subnet, traffic is forwarded at L2 (the second layer of the seven-layer Open Systems Interconnection (OSI) model of computer networking) using, e.g., MAC addresses. When the hosts are in different subnets, traffic is forwarded at L3 (the third layer of the seven-layer OSI model of computer networking) using, e.g., IPv4 or IPv6 addresses.

Figure 2:
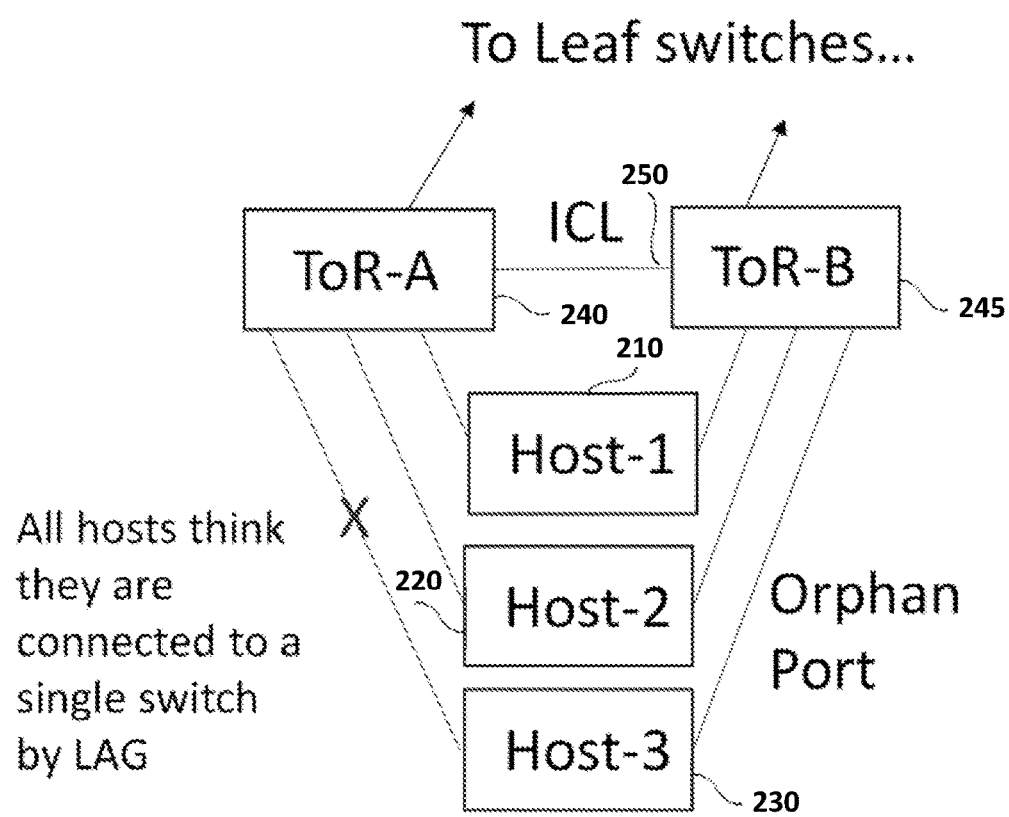
FIG. 2 depicts a prior art multihoming network with VLT link between two ToR switches.

FIG. 2 depicts a prior art multihoming network 200 with dual ToR switches and a VLT link between the ToR switches. As shown in FIG. 2, a VLT is implemented for an ICL 250 between two ToR switches 240 and 245, with each ToR switch connected to multiple hosts 210, 220 and 230. VLT is a link aggregation protocol that is run between multiple switches and allows for the hosts to be connected to multiple ToRs. When VLT is used between a pair of switches, it allows users to set up an aggregated link towards those two switches (e.g. the ToR switches) by presenting those switches as a single logical switch, since a standard aggregated link can only terminate on a single switch.

However, the VLT approach is a heavyweight solution requiring reserved links for ICL use, proprietary primary/secondary election, and various protocol modifications to run on primary with remote hosts or switches. Furthermore, as a part of the VLT protocol, the ICL is used to synchronize MAC table and address resolution protocol (ARP)/neighbor discovery (ND) protocol entries. The ICL may also need to implement traffic steering for orphan ports, which refers to ports of a single attached host, e.g. the host 230 when a link between the host 230 and the ToR switch 240 fails. As an example shown in FIG. 2, traffic coming from the leaf switches to ToR-A 240 with destination to the host 230 would need to be delivered via the ICL 250, since the link between the ToR-A and the host 230 fails.

Figure 3:
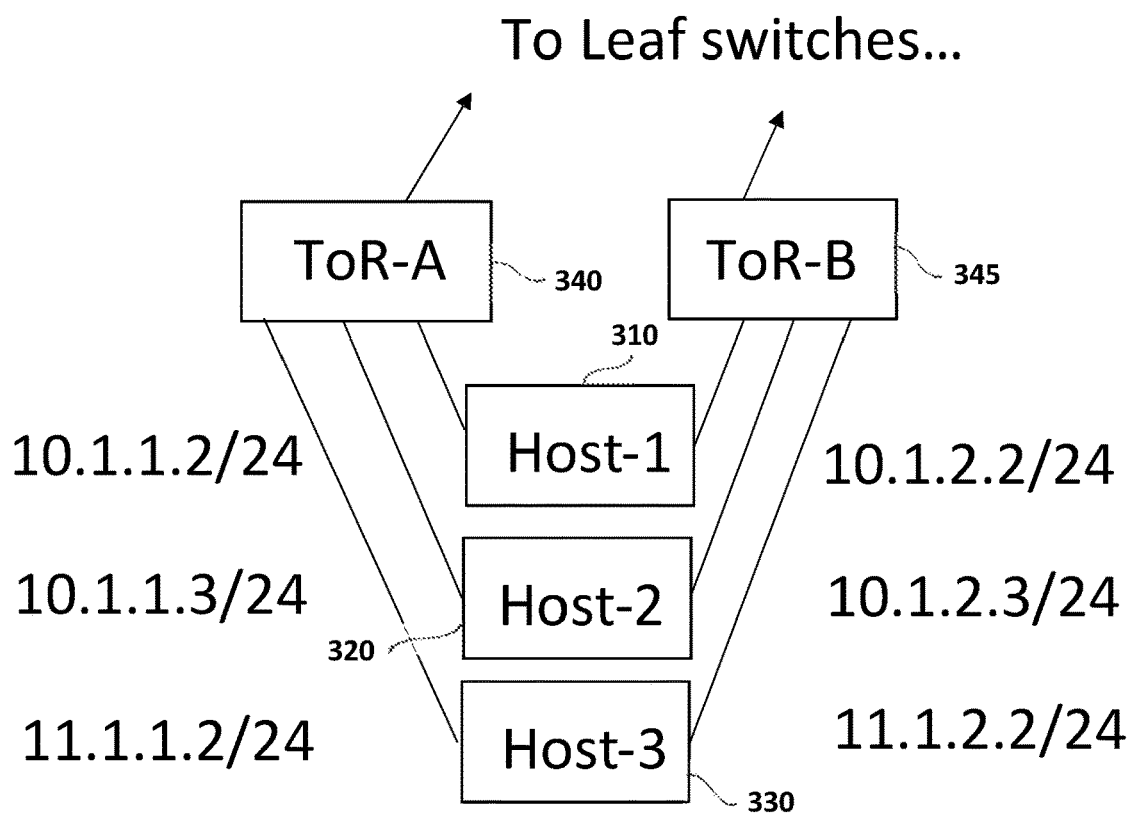
FIG. 3 depicts a prior art multihoming network with separate Internet Protocol (IP) interfaces for each host.

An alternative approach would be depending on the hosts for an entire solution where each leg of the host has its own IP address/subnet. FIG. 3 depicts such a prior art multihoming network 300 with separate IP interfaces for each host 310, 320, and 330. The multihoming network 300 does not use an ICL, and therefore the ToR switches 340 and 345 are in separate L2 domains. Separate IP interfaces from different subnets between each host and each ToR switch may be needed, as shown in FIG. 3 of two IP address for each host. Such approach imposes a heavy burden of double address consumption and pushes all the complexity to the host. Unless tunneling is used, a link failure will result in all TCP connections to that IP interface being torn down. The use of tunneling itself also imposes complexity and data path overhead.

B. Embodiments of Lightweight Host Multihoming

Described in this section are embodiments for lightweight host multihoming. One skilled in the art will recognize that embodiments of the present disclosure may be implemented in a variety of ways, such as a process, an apparatus, a system/device, or a method on a tangible computer-readable medium.

Figure 4:
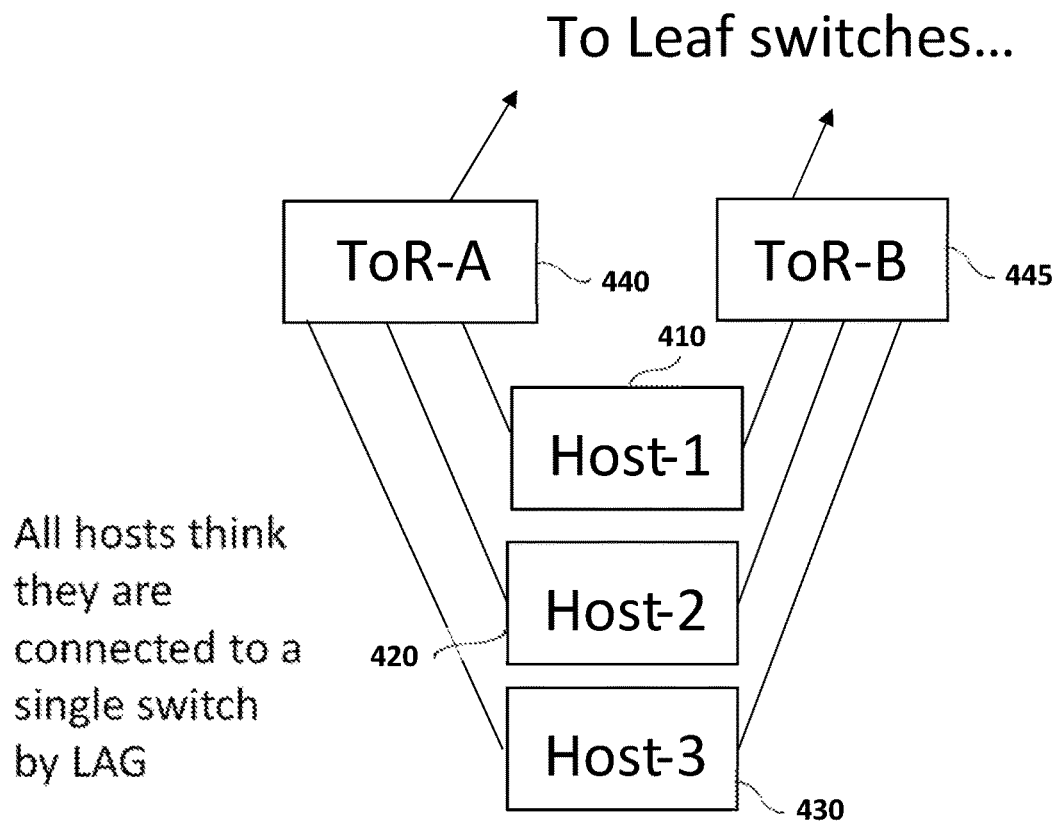
FIG. 4 depicts a lightweight host multihoming network, according to embodiments of the present disclosure.

FIG. 4 depicts a lightweight host multihoming network 400, according to embodiments of the present disclosure. The lightweight host multihoming network comprises two network switches 440 and 445, with each switch connected to multiple hosts 410, 420 and 430. In one or more embodiments, the network switches 440 and 445 are ToR switches. There is no protocol in use for synchronization of information between the two ToR switches. With at least some implementations for the ToR switches, the multihoming network may be configured as if the hosts are connected to a single switch by link aggregation group (LAG). The LAG may be able to combine multiple physical ports together to make a single data path, so as to implement traffic load sharing among the multiple ports in a group and to enhance the connection reliability. In one or more embodiments, the lightweight host multihoming network 400 may comprise one or more hosts that are to be multi-homed or one or more hosts that are singled-homed but in the same subnet as a multi-homed host.

In one or more embodiments, in response to an Address Resolution Protocol (ARP) request from a host for a default gateway IP address, both ToR switches 440 and 445 respond with a shared virtual MAC address. The shared virtual MAC address may be bound along with a virtual IP address used for the default gateway. The shared virtual MAC address may also be used for a system ID in Link Aggregation Control Protocol (LACP), which provides a method to control the bundling of several physical ports together to form a single logical channel. LACP also allows a network device to negotiate an automatic bundling of links by sending LACP packets to a directly-connected device that also implements LACP.

In one or more embodiments, in the multihoming network 400, /30 or /31 subnets are provisioned for each LAG to eliminate a need of multicasts for L2 connectivity. Each ToR switch 440 or 445 advertises a /30 or /31 subnet for each host. If a link to a host goes down, the /30 or /31 subnet is withdrawn. In one or more embodiments, a routing protocol advertises each subnet, so that a local link failure between a ToR switch and a host may cause a local route entry to be removed and traffic to be routed to a working ToR switch for the host via leaf switches. However, such a /30 or /31 subnet provision approach doubles consumption of IP addresses for a set of hosts.

In one or more embodiments, the multihoming network 400 may use regular subnets instead of /30 or /31 subnets. When regular subnets are used, the flooding behavior, ARP/ND handling, or data path forwarding of the multihoming network 400 may need to be configured to perform lightweight multihoming. In one or more embodiments, all ARP/ND traffic from a host (or server) is processed by a switch, while any non-ARP, non-ND broadcast, unknown unicast and multicast (BUM) traffic from the host is discarded for flooding suppressing. In one or more embodiments, even the traffic within a subnet is forwarded using a router MAC address (the shared virtual MAC address configured at the ToR switch), which may result in time-to-live (TTL) decrement. TTL refers to the number of router hops a packet can traverse in a network before being discarded. In normal situation, the TTL decrement is not an issue. However, when the TTL decrement becomes a problem, the ToR switch's data path processing may need to be modified, to suppress TTL decrement, when data forwarding is within a subnet on a given ToR switch.

In one or more embodiments, for a host that is to be multi-homed or for a host that is singled-homed but in the same subnet as a multi-homed host, ports on the switch (e.g. a ToR switch) that are connected to the host are either manually configured with a static ARP/ND entry (e.g. a binding of host IP address to MAC address) or they may be configured to receive the host IP address to MAC address binding via a discovery protocol. A static ARP/ND entry is an address resolution manually added to a cache table for a device and is retained in the cache on a permanent basis. In one or more embodiments, the discovery protocol is a Link Layer Discovery Protocol (LLDP), which is a vendor-neutral link layer protocol used by network devices to advertise their identity, capabilities, and neighbors on a local Ethernet network. In one or more embodiments, such modifications to ARP/ND handling are not needed when using /30 or /31 subnets.

In one or more embodiments, link liveness in the multihoming network 400 may be detected using LACP or Bidirectional Forwarding Detection (BFD). The BFD is a lightweight protocol providing low-overhead, short-duration detection of failures in the path between adjacent forwarding engines. In one or more embodiments, the BFD used for link liveness detection is a micro-BFD to provide BFD with the ability to verify link liveness for every LAG link. Micro-BFD is LAG-aware for the detection of physical member link failures, as well as the overall LAG interface failure. In one or more embodiments, a single micro-BFD session runs on each member link of a LAG for every enabled address family. In one or more embodiments, a port down may be detected by loss of signal (e.g. electrical or light signal).

In one or more embodiments, the multihoming network 400 may comprise both multi-homed hosts and regular (e.g. single-homed) hosts on the same switch. In one or more embodiments, the single-homed hosts are not in the same subnet as the multi-homed hosts because only host routes may be advertised from a ToR switch to a leaf layer via a routing protocol. If even one host in that subnet is configured to be a multi-homed host, the switch may need to either use static ARP/ND entry configuration or discovery protocol-based registration for the mapping of IP address to MAC address for all hosts in that subnet regardless of whether they are single- or multi-homed hosts.

Figure 5:
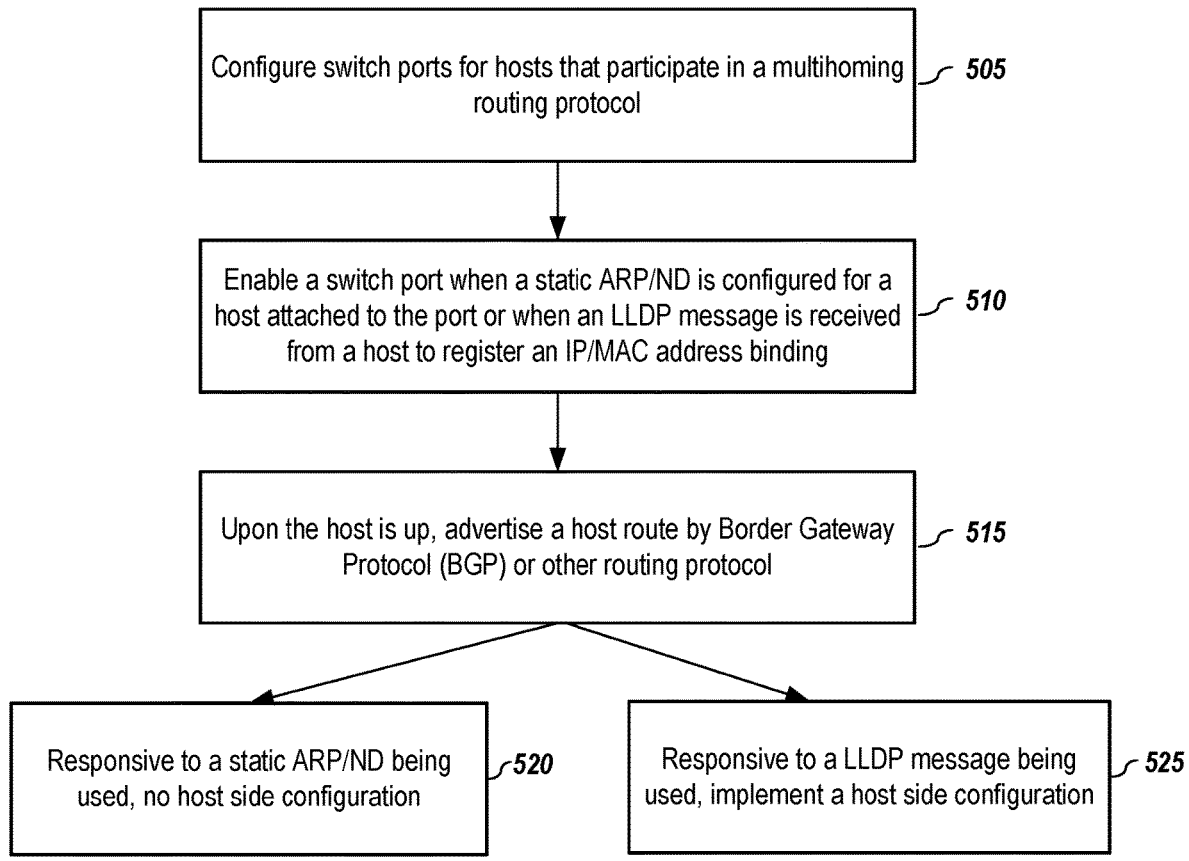
FIG. 5 depicts a process of lightweight host multihoming bring-up sequence, according to embodiments of the present disclosure.

FIG. 5 depicts a process for lightweight host multihoming bring-up sequence, according to embodiments of the present disclosure. During configuration implementation of the multihoming network 400, the switches 450 and 445 configure (505) ports for one or more servers or hosts that participate in a multihoming routing protocol. In one or more embodiments, such a port may be enabled (510) (otherwise be considered down) when a static ARP/ND entry is configured for a host attached to that port. Alternatively, it may be configured to learn the host IP address to MAC address binding from a discovery protocol (e.g. LLDP) in which case the port may be enabled when such discovery protocol message is received. In one or more embodiments, the discovery protocol may be a Virtual Station Interface (VSI) Discovery and Configuration Protocol (VDP). Afterwards, as long as the port is up, a host route is advertised (515) by Border Gateway Protocol (BGP) or other routing protocol. In one or more embodiments, aggregation at a subnet level is only done at a leaf switch; i.e. the subnet is not advertised by the ToR switch. If a static ARP/ND entry is used for port configuration at the ToR switch, no host configuration is needed (520). Static ARP/ND entry configuration in the ToR switch may be handled by enhancing or coordination with server configuration tools. Responsive to a LLDP message being used, one or more host side configurations are is implemented (525). Regarding the host configurations, in one or more embodiments, a new LLDP type length value (TLV) may be defined to include the MAC address to IP address binding for that host. In one or more embodiments, the host is configured to be capable of sending this new TLV, and the ToR switch is configured to be capable of receiving and processing it.

Figure 6:
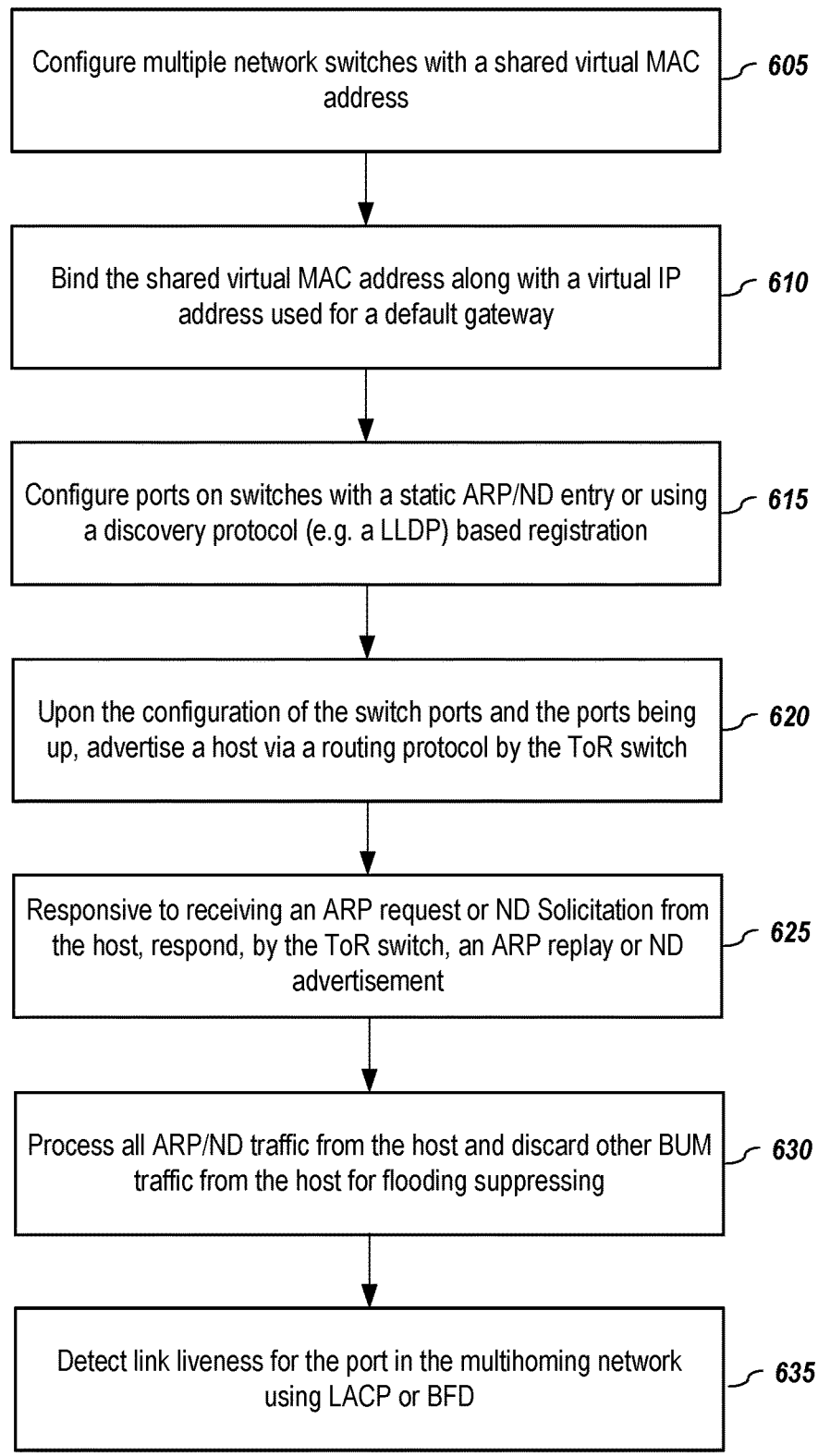
FIG. 6 depicts a process of lightweight host multihoming operation, according to embodiments of the present disclosure.

FIG. 6 depicts a process of lightweight host multihoming operation, according to embodiments of the present disclosure. For a multi-homing system comprising multiple network switches (e.g. ToR switch), the multiple network switches are configured (605) with a shared virtual MAC address. The shared virtual MAC address may be bound (610) along with a virtual IP address used for a default gateway for the multihoming network. For a host that is multi-homed or for a host that is singled-homed but in the same subnet as a multi-homed host, ports on the ToR switches that are connected to the host are either configured (615) with a static ARP/ND entry or to use a discovery protocol (e.g. a LLDP) based registration, in which a LLDP message indicating a host IP address to MAC address binding is received from the host. In the case where LLDP is used, the port remains in a disabled state until such LLDP binding is received from the host. Upon the configuration of the switch ports and the ports being up, a host is advertised (620) via a routing protocol, e.g. a BGP, by the ToR switch. Responsive to receiving an ARP Request or ND Solicitation from the host for the default gateway IP address, the ToR switch responds (625) with an ARP Reply or ND Advertisement containing a default gateway MAC address with a shared virtual MAC address to the host.

In one or more embodiments, when a port to a host goes down, the ToR switch may withdraw the host route associated with that port via the routing protocol (e.g. BGP). The subnet address is not distributed via the routing protocol by the ToR switch regardless of whether the port is up or down. In one or more embodiments, the port itself may be a LAG. In such a situation, the host route may not be withdrawn unless all ports are down.

In one or more embodiments, the processes in FIG. 6 may further comprise processing (630) all ARP/ND traffic from a host by the switch and discarding other BUM traffic from the host for flooding suppressing. The processes in FIG. 6 may further comprise detecting (635) link liveness for the port in the multihoming network using LACP or BFD. As described above, the BFD may be a micro-BFD for ability to verify link liveness for every link within a LAG.

C. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 7:
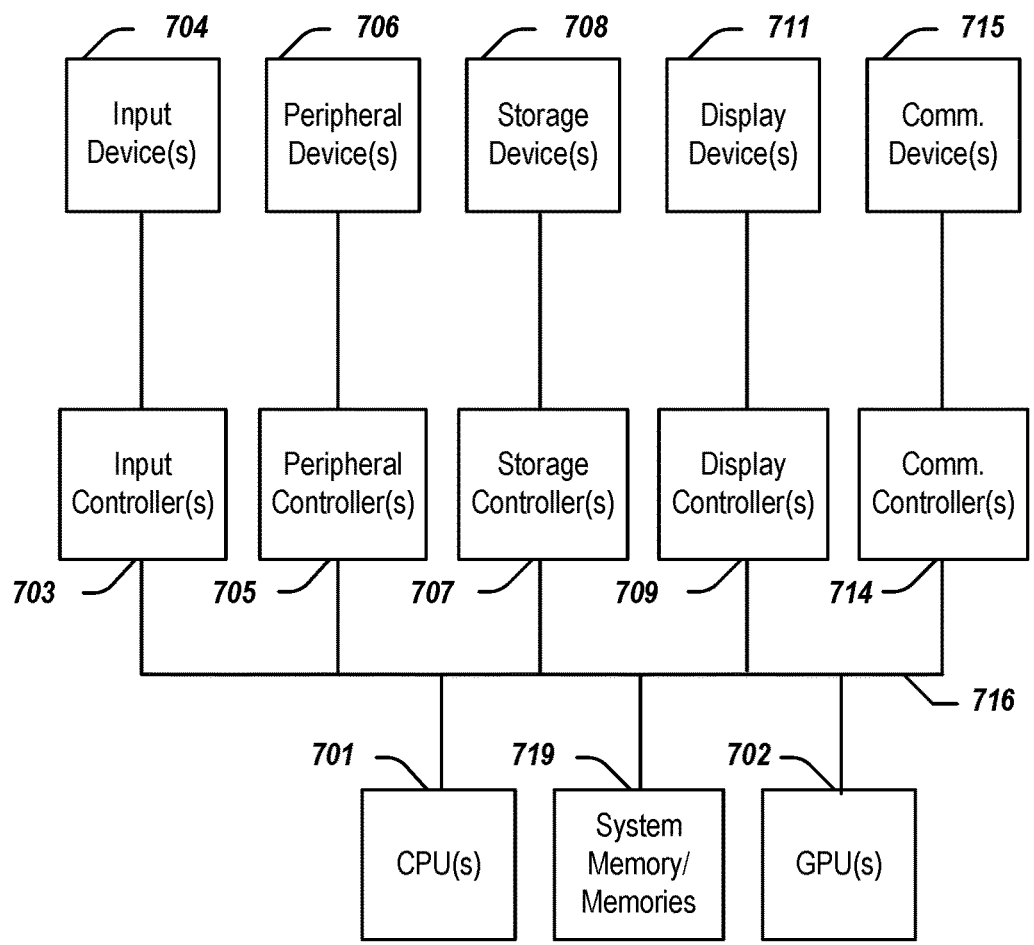
FIG. 7 depicts a simplified block diagram of an information handling system according to embodiments of the present invention.

FIG. 7 depicts a simplified block diagram of an information handling system (or computing system) according to embodiments of the present disclosure. It will be understood that the functionalities shown for system 700 may operate to support various embodiments of a computing system—although it shall be understood that a computing system may be differently configured and include different components, including having fewer or more components as depicted in FIG. 7.

As illustrated in FIG. 7, the computing system 700 includes one or more central processing units (CPU) 701 that provides computing resources and controls the computer. CPU 701 may be implemented with a microprocessor or the like, and may also include one or more graphics processing units (GPU) 719 and/or a floating-point coprocessor for mathematical computations. In one or more embodiments, one or more GPUs 719 may be incorporated within the display controller 709, such as part of a graphics card or cards. System 700 may also include a system memory 702, which may be in the form of random-access memory (RAM), read-only memory (ROM), or both.

A number of controllers and peripheral devices may also be provided, as shown in FIG. 7. An input controller 703 represents an interface to various input device(s) 704, such as a keyboard, mouse, touchscreen, and/or stylus. The computing system 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present disclosure. Storage device(s) 708 may also be used to store processed data or data to be processed in accordance with the disclosure. The system 700 may also include a display controller 709 for providing an interface to a display device 711, which may be a cathode ray tube (CRT), a thin film transistor (TFT) display, organic light-emitting diode, electroluminescent panel, plasma panel, or other type of display. The computing system 700 may also include one or more peripheral controllers or interfaces 705 for one or more peripherals 706. Examples of peripherals may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 8:
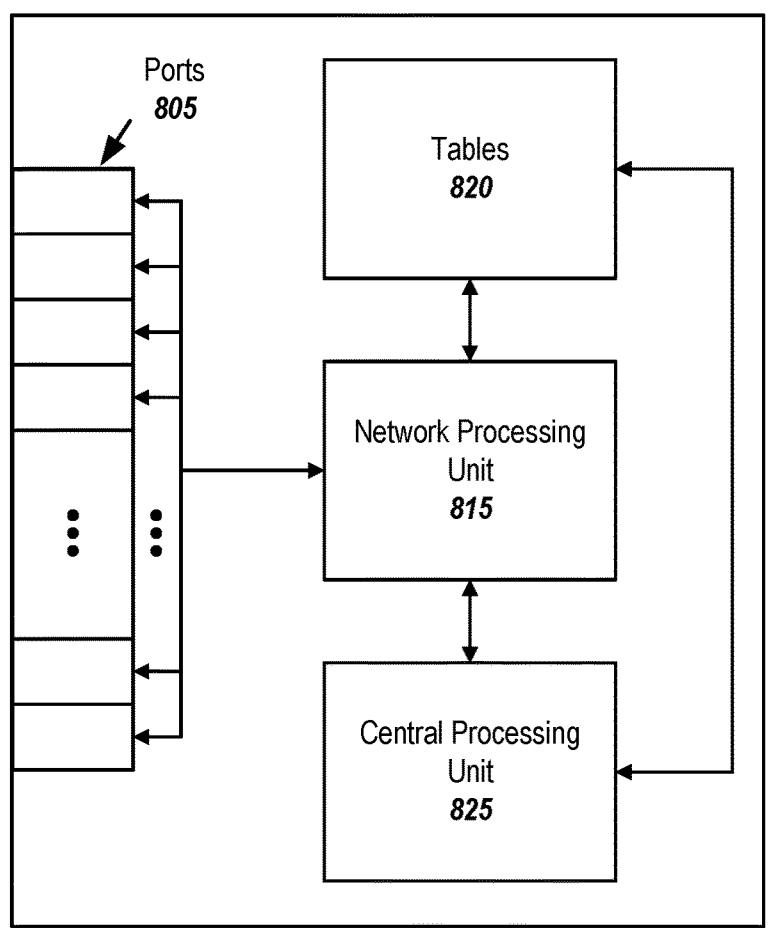
FIG. 8 depicts an alternative block diagram of an information handling system, according to embodiments of the present disclosure.

FIG. 8 depicts an alternative block diagram of an information handling system, according to embodiments of the present disclosure. It will be understood that the functionalities shown for system 800 may operate to support various embodiments of the present disclosure—although it shall be understood that such system may be differently configured and include different components (including fewer or more components).

The information handling system 800 may include a plurality of I/O ports 805, a network processing unit (NPU) 815, one or more tables 820, and a central processing unit (CPU) 825. The system includes a power supply (not shown) and may also include other components, which are not shown for sake of simplicity.

In one or more embodiments, the I/O ports 805 may be connected via one or more cables to one or more other network devices or clients. The network processing unit 815 may use information included in the network data received at the node 800, as well as information stored in the tables 820, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for host multi-homing comprising:
   for a network switch in a multi-homing system performing steps comprising:
      configuring the network switch with a virtual MAC address that is the same as another network switch in the multi-homing system;
      configuring the network switch with a virtual Internet Protocol (IP) address that is the same as the another network switch, the virtual IP address is used as a default gateway for the multi-homed system;
      for a host that is to be multi-homed or for a host that is singled-homed but in a same subnet as a multi-homed host, configuring one or more ports on the network switch that are connected to the host with:
         at least one of a static Address Resolution Protocol (ARP) entry and Neighbor Discovery (ND) entry; or
         a discovery protocol-based registration, responsive to a discovery protocol is used in one port, the port is disabled for user traffic until an IP address to MAC address binding is received from the host by the discovery protocol, the network switch and the another network switch have no state synchronization regarding the MAC address;
      upon the one or more ports coming up, advertising via a routing protocol a host route for the host; and
      processing ARP or ND traffic from the host.

2. The method of claim 1 further comprising:
   discarding any non-ARP, non-ND broadcast, unknown unicast and multicast (BUM) traffic from the host.

3. The method of claim 1 further comprising:
   forwarding traffic within a subnet using the virtual MAC address.

4. The method of claim 1 further comprising:
   using a Link Aggregation Control Protocol (LACP) or Bidirectional Forwarding Detection (BFD) to determine liveness of a port of the host.

5. The method of claim 4 wherein the BFD is a micro-BFD protocol.

6. The method of claim 4 further comprising:
   responsive to liveness of the port of the host being lost, withdrawing via the routing protocol the host route for the host.

7. The method of claim 1 wherein the network switch and the another network switch are top-of-rack (ToR) switches.

8. The method of claim 1 wherein the discovery protocol is a Link Layer Discovery Protocol (LLDP).

9. The method of claim 1 wherein the discovery protocol is a Virtual Station Interface (VSI) Discovery and Configuration Protocol (VDP).

10. A multi-homing system comprising:
    one or more hosts; and a pair of network switches coupled to the one or more hosts, the pair of network switches have a shared virtual MAC address and a shared virtual Internet Protocol (IP) address, the shared virtual IP address is used as a default gateway for the multi-homed system, each network switch is configured to:
  either configure an Address Resolution Protocol (ARP) or Neighbor Discovery (ND) entry, or receive, via a discovery protocol-based registration, an IP address to MAC address binding of a host attached to one or more ports, the host is to be multi-homed or singled-homed but in a same subnet as a multi-homed host, the network switch and another network switch of the pair of network switches have no state synchronization regarding the MAC address, the one or more ports are disabled for user traffic until the IP address to MAC address binding is received from the host by the discovery protocol;
  advertise via a routing protocol a host route for the host upon the one or more ports coming up; and
  process ARP or ND traffic from the host.

11. The multi-homing system of claim 10 wherein the pair of network switches are top-of-rack (ToR) switches.

12. The multi-homing system of claim 11 wherein each ToR switch discards broadcast, unknown unicast and multicast (BUM) traffic from the host.

13. The multi-homing system of claim 11 wherein each ToR switch forwards traffic within a subnet using the shared virtual MAC address.

14. The multi-homing system of claim 11 wherein each ToR switch uses a Link Aggregation Control Protocol (LACP) or Bidirectional Forwarding Detection (BFD) to determine liveness of a port of the host.

15. The multi-homing system of claim 14 wherein the BFD is a micro-BFD.

16. A non-transitory computer-readable medium or media comprising one or more sequences of instructions which, when executed by one or more processors, causes the steps for host multi-homing in a multi-homing system comprising one or most hosts to be performed comprising:
  configuring a network switch in the multi-homing system with a virtual MAC address that is the same as another network switch in the multi-homing system;
  configuring the network switch with a virtual Internet Protocol (IP) address that is the same as the another network switch, the virtual IP address is used as a default gateway for the multi-homed system;
  configuring either a static Address Resolution Protocol (ARP) or Neighbor Discovery (ND) entry, or configuring a discovery protocol-based registration for one or more ports on the network switch that are connected to a host that is to be multi-homed or a host that is singled-homed but in a same subnet as a multi-homed host, the one or more ports are disabled for user traffic until an IP address to MAC address binding is received from the host by the discovery protocol, the network switch and the another network switch have no state synchronization regarding the MAC address;
  advertising via a routing protocol a host route for the host; and
  processing ARP or ND traffic from the host.

17. The non-transitory computer-readable medium or media of claim 16 wherein the steps further comprising: discarding broadcast, unknown unicast and multicast (BUM) traffic from the host.

18. The non-transitory computer-readable medium or media of claim 17 wherein the steps further comprising:
  forwarding traffic within a subnet using the shared virtual MAC address.

19. The non-transitory computer-readable medium or media of claim 17 wherein the steps further comprising:
  determining, using a Link Aggregation Control Protocol (LACP) or Bidirectional Forwarding Detection (BFD), liveness of a port of the host.

20. The non-transitory computer-readable medium or media of claim 19 wherein the BFD is a micro-BFD.

* * * * *